(12) United States Patent
Hamasaki

(10) Patent No.: US 11,148,741 B2
(45) Date of Patent: Oct. 19, 2021

(54) UNLOCK FUNCTION FOR BICYCLE LIGHT

(71) Applicant: Noriaki Hamasaki, Lake Forest, CA (US)

(72) Inventor: Noriaki Hamasaki, Lake Forest, CA (US)

( * ) Notice: Subject to any disclaimer, the term of this patent is extended or adjusted under 35 U.S.C. 154(b) by 251 days.

(21) Appl. No.: 16/586,449

(22) Filed: Sep. 27, 2019

(65) Prior Publication Data

US 2021/0094644 A1    Apr. 1, 2021

(51) Int. Cl.
| | |
|---|---|
| *B62J 6/02* | (2020.01) |
| *B62J 6/16* | (2020.01) |
| *F21S 9/02* | (2006.01) |
| *B62J 6/01* | (2020.01) |
| *B60R 25/02* | (2013.01) |
| *B62J 45/00* | (2020.01) |
| *F21Y 115/10* | (2016.01) |

(52) U.S. Cl.
CPC ............ *B62J 6/02* (2013.01); *B60R 25/02* (2013.01); *B62J 6/01* (2020.02); *B62J 6/16* (2013.01); *F21S 9/02* (2013.01); *B62J 45/00* (2020.02); *F21Y 2115/10* (2016.08)

(58) Field of Classification Search
CPC ........ B62J 6/01; B62J 6/02; B62J 6/16; F21S 9/02; B60R 25/02
See application file for complete search history.

(56) References Cited

U.S. PATENT DOCUMENTS

| | | | |
|---|---|---|---|
| 2010/0123402 A1* | 5/2010 | Chen .................. | B62J 6/04 315/156 |
| 2013/0033886 A1* | 2/2013 | Popper .............. | B62J 6/02 362/538 |

OTHER PUBLICATIONS

SSB Design, Inc., dba Cygolite "F series (F1000-F750-F600)" © 2019, User Manual (1 page).

* cited by examiner

*Primary Examiner* — Thomas M Sember

(57) ABSTRACT

Methods, systems, devices and apparatus for unlocking a bicycle light. The bicycle light includes a power socket configured to receive a charging device. The bicycle light includes a light having multiple states. The multiple states include a locked state, an unlocked state, a powered on state, and a powered off state. The light is configured to illuminate when the in the powered on state. The bicycle light includes a controller. The controller is coupled to the power socket and the light. The controller is configured to determine that the light is in the locked state. The controller is configured to detect electrical power from the power socket. The controller is configured to switch the light from the locked state to the unlocked state when the electrical power is detected.

20 Claims, 6 Drawing Sheets

UNLOCK FUNCTION FOR BICYCLE LIGHT

BACKGROUND

Field

The present disclosure relates to systems, apparatuses and methods for controlling a light for a bicycle.

Description of the Related Art

Cycling is a popular activity during the day and/or in the evening. Cycling accidents may occur particularly at night and when bicycles share the same roads with vehicular traffic. Thus, an important accessory to have while cycling is a bicycle light. The bicycle light provides much needed illumination to see and to be seen during the evening time and even throughout the day.

Bicycle lights are becoming more advanced and are incorporating more features to enhance a user's enjoyment. A bicycle light may have different daytime and/or nighttime modes, which provide various functions, such as different types and magnitudes of illumination. These various functions along with illuminating the light require power from a power storage device, such as a battery, to function. The power storage device must be compact enough to be contained within compact case or housing and to be mounted on the bicycle. In order to be contained within a compact housing, the overall size of the power storage device is limited, which also reduces the amount of charge that can be stored. Thus, the bicycle light must conserve electrical energy, when possible, to minimize the overall size of the power storage device and extend the life of the power storage device before a recharge is needed.

Accordingly, there is a need for a system, apparatus and/or a method to lock the bicycle light when not in use and automatically unlock the bicycle light without the user explicitly initiating an unlock sequence.

SUMMARY

In general, one aspect of the subject matter described in this disclosure may be embodied in a bicycle light. The bicycle light includes a power socket configured to receive a charging device. The bicycle light includes a light having multiple states. The multiple states include a locked state, an unlocked state, a powered on state, and a powered off state. The light is configured to illuminate when the light is in the powered on state. The bicycle light includes a controller. The controller is coupled to the power socket and the light. The controller is configured to determine that the light is in the locked state. The controller is configured to detect electrical power from the power socket. The controller is configured to switch the light from the locked state to the unlocked state when the electrical power is detected.

These and other embodiments may optionally include one or more of the following features. The bicycle light may include a power storage device. The power storage device may have a state of charge and may be configured to provide electrical charge to the light to illuminate the bicycle light. The controller may be configured to measure the electrical power from the power socket. The controller may switch the light from the locked state to the unlocked state when the electrical power is greater than or equal to a threshold charge. The controller may be configured to indicate to a user that the light is being switched from the locked state to the unlocked state after the electrical power is detected. The controller may be configured to cycle the light between the powered on state and the powered off state in an on-off sequence to indicate to the user that the light is being switched from the locked state to the unlocked state.

The controller may be a microcontroller. The microcontroller may have multiple inputs including a first input, second input and a third input. The first input may be electrically connected to the power socket. The second input may be electrically connected to a button and a third input may be electrically grounded. The power socket may be a Universal Serial Bus (USB) socket and the charging device is a USB device. The microcontroller may be configured to receive the electrical power at the first input from an output of the USB socket.

In another aspect, the subject matter may be embodied in a method to unlock a bicycle light. The method includes determining, by a controller, that the light is in a locked state. The method includes detecting, by the controller, electrical power from a power socket. The method includes switching, by the controller, the light from the locked state to the unlocked state when the electrical power is detected.

In another aspect, the subject matter may be embodied in a bicycle light. The bicycle light includes a power socket. The power socket is configured to receive a charging device. The bicycle light includes a light. The light has multiple states including a locked state, an unlocked state, a powered on state and a powered off state. The light is configured to illuminate when in the powered on state. The bicycle light includes a power storage device. The power storage device has a state of charge. The power storage device is configured to power the light. The bicycle light includes a microcontroller. The microcontroller is coupled to the power socket, the power storage device and the light. The microcontroller is configured to detect electrical power from the power socket. The microcontroller is configured to switch the light from the locked state to the unlocked state when the electrical power is detected.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatus, devices and methods for automatically unlocking a bicycle light. Particular embodiments of the subject matter described in this disclosure may be implemented to realize one or more of the following advantages. The bicycle light has multiple states and modes. The multiple modes includes various daytime and nighttime modes, which adjusts the brightness of the illumination of the light and the may adjust the flashing or pulsing of the light. By having various levels of brightness and by adjusting the flashing or pulsing of the light, the bicycle light provides illumination for the bicycle rider, while also allowing the bicycle rider to be seen.

The multiple states include an unlocked and a locked state. In the unlocked state, the bicycle light may freely turn on, turn off and cycle through different modes when the power button is depressed. In the locked state, the bicycle light prevents a user from turning on the light even when the button is depressed. By having the unlocked and locked state, the bicycle light may prevent the light from turning on when the button is unintentionally depressed. This prevents the battery from unintentionally providing power to light, which conserves electrical energy and improves energy efficiency.

When in the locked state, some users, however, may believe that the bicycle light is malfunctioning, which it is not. For example, the bicycle light may be sold or pre-configured in the locked state during manufacturing, which may cause the consumer to believe that the bicycle light is malfunctioning when first purchased. Thus, the bicycle light may include the ability to automatically unlock when a power device charges the bicycle light. This automatic unlock feature will automatically switch a bicycle light in the locked state to the unlocked state when a power source is connected to the bicycle light to charge the bicycle light. By having the automatic unlock feature, the bicycle light automatically unlocks when charging so that the bicycle light is placed in an operational state to prevent the user from believing that the bicycle light is malfunctioning when the bicycle light was unintentionally or without the knowledge of the user set in the locked state.

Figure 1A:
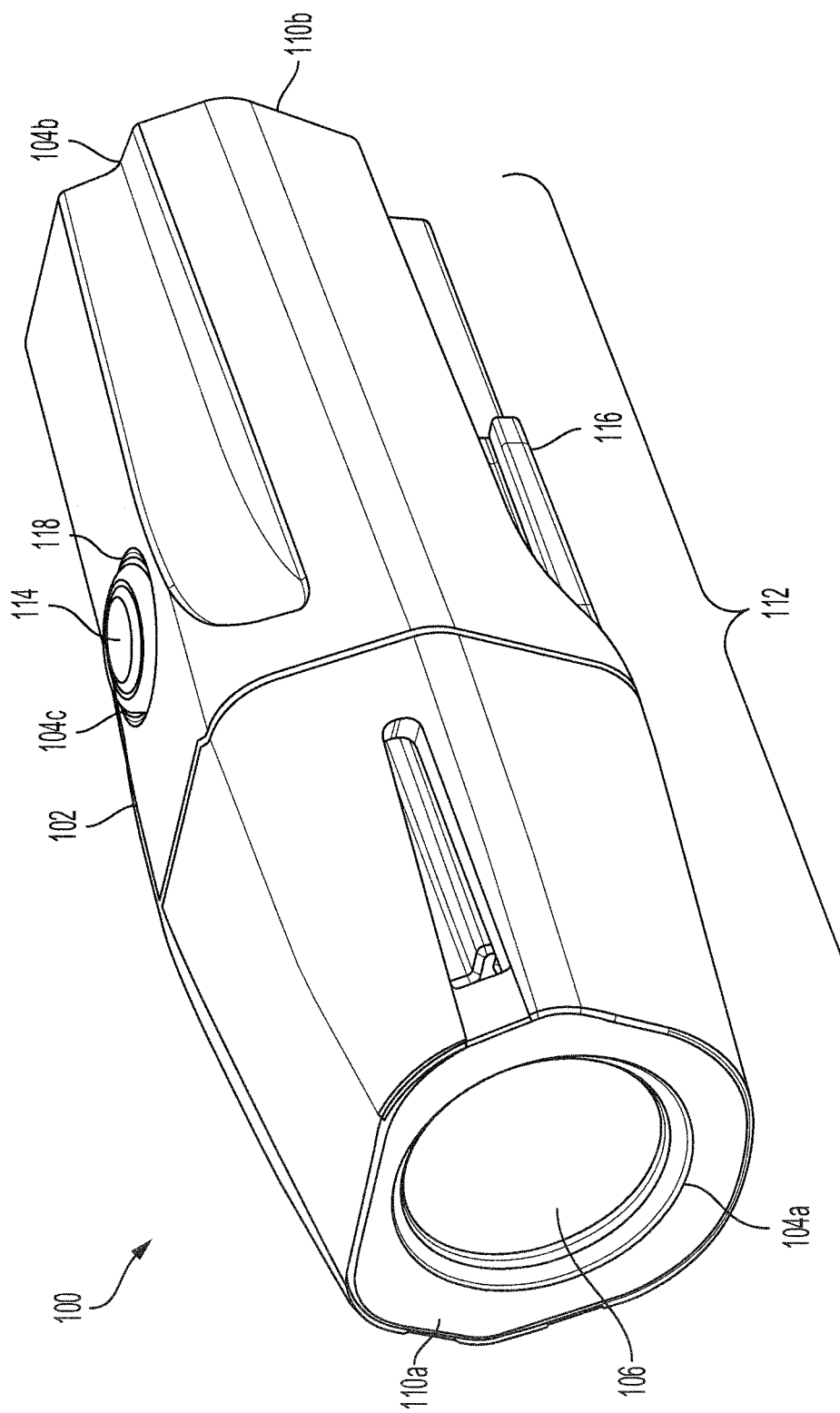
FIG. 1A shows a front-perspective view of an example bicycle light according to an aspect of the invention.

FIG. 1A shows a front-perspective view of an example bicycle light 100. The bicycle light 100 may have a mount (not shown) that is used to connect, couple or otherwise mount to a bicycle. A bicycle, otherwise known as a cycle or bike, is a human-powered or motor-powered, pedal-driven, single-track vehicle, having two wheels attached to a frame, one behind the other. The bicycle light 100 has a case, encasement, housing or other enclosure ("housing") 102 that surrounds or encloses an illumination control circuit ("illumination circuit") 200. The housing 102 may be polygonal, cylindrical or otherwise tubular-shaped and hollow within to surround or enclose the illumination circuit 200 to prevent environmental variables from affecting the illumination circuit 200.

Figure 1B:
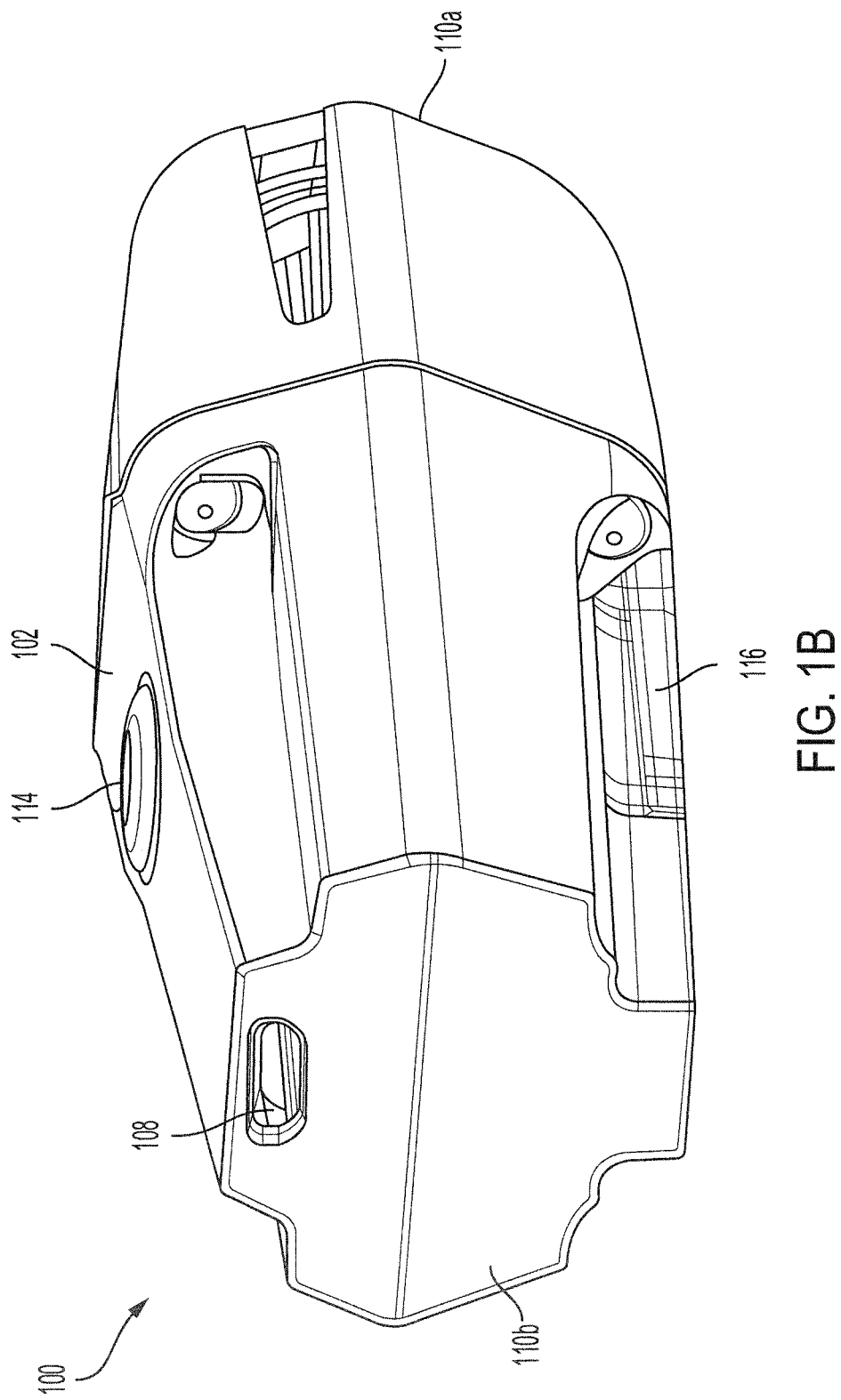
FIG. 1B shows a rear-perspective view of the bicycle light of FIG. 1A according to an aspect of the invention.

The housing 102 surrounds or encloses the illumination circuit 200. The housing 102 has one or more openings 104a-c. The one or more openings 104a-c expose or provide access to one or more components of the illumination circuit 200, such as the light 106, the power socket 108 and/or the button 114. The housing 102 may have two ends 110a-b with a longitudinal surface 112 that extends lengthwise between the two ends 110a-b. The first end 110a of the housing 102 may have an opening 104a that allows a light 106 or other illumination device to illuminate through the opening 104a. The second end 110b of the housing 102, which may be opposite the first end 110a of the housing 102, may have an opening 104b that exposes or provides access to an input end of the power socket 108, as shown in FIG. 1B. Along the longitudinal surface 112, the housing 102 may have an opening 104c that exposes or provides access to the button 114 or other user interface element. The button 114 may be a power button that may change the state and/or the mode of the light 106, which is discussed further in FIG. 4. Along the perimeter of the opening 104c and/or surrounding the perimeter of the button 114 may be an LED indicator 118. The LED indicator 118 may illuminate to provide status of the bicycle light 100, such as when the bicycle light 100 is charging or when the button 114 is depressed.

The longitudinal surface 112 may have one or more grooves or channels 116. The one or more grooves or channels 116 may slide, slot or otherwise fasten onto a mounting device to couple, fasten or otherwise mount to the bicycle.

Figure 2:
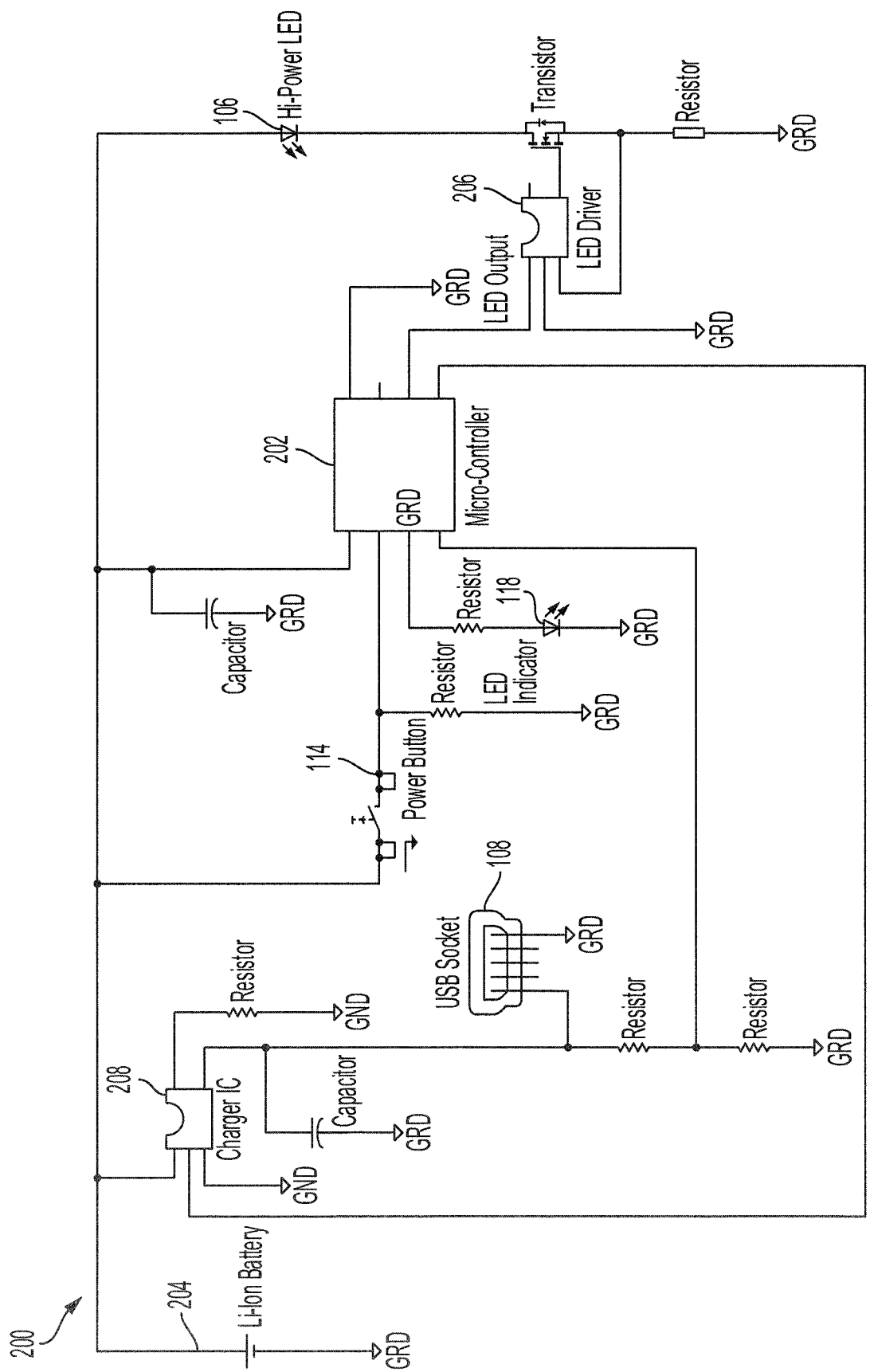
FIG. 2 shows an example illumination control circuit enclosed within the bicycle light of FIGS. 1A-1B according to an aspect of the invention.

FIG. 2 shows the illumination circuit 200. The illumination circuit 200 controls and operates the light 106. The illumination circuit 200 may set the light 106 into different states, such as a powered on, powered off, locked and/or unlocked state for the light 106. Additionally, the illumination circuit 200 may set the light 106 into different modes and adjust the brightness of the light 106 for the different modes. The different modes may include a low brightness, such as having a brightness of approximately between 20%-30%, a medium brightness, such as having a brightness of approximately between 45%-55%, a medium-high brightness, such as having a brightness of approximately between 70%-80%, a high brightness, such as having a brightness over 90%, a night-pulsing, flash, such as a four flash or one flash on-off sequence, rapid zap, such as a patterned flicker and/or flash and/or a walk mode, such as a low steady beam. Each of the modes may control the brightness of the light 106 and/or the frequency of the flashing or pulsating between an on and off state of the light 106.

The illumination circuit 200 includes one or more power sockets 108, one or more buttons 114, knobs, toggles, switches or other user interface elements, one or more lights 106 to illuminate an area surrounding the bicycle light, a power storage device 204, and a controller 202. The illumination circuit 200 may include a light-emitting diode (LED) driver 206, a charge controller integrated circuit ("charge control IC") 208 and/or an LED indicator 118 or other indicator.

The illumination circuit 200 includes one or more power sockets 108. The one or more power sockets 108 include one or more Universal Serial Bus (USB) connectors, e.g., Dual USB connector or USB connector, one or more lightning USB connectors, a USB Type-C (USB-C) connector and/or a micro USB connector. Each of the one or more power sockets 108 has one or more pins including a voltage input pin (V+), a ground pin (V−) and/or one or more data pins. The voltage pin (V+) may receive a charge, i.e., electrical current, from a charging device to deliver the charge to the power storage device 204 and/or to the light 106. The wattage of the charge from the charging device may vary. In some implementations, the one or more power sockets 108 may be a wireless receiver, which may receive a wireless charge.

The illumination circuit 200 may have a charge control IC 208. The charge control IC 208 may be connected to the voltage pin (V+) of the one or more power sockets 108 and/or the power storage device 204. The charge control IC 208 receives the charge from the charging device and may regulate, limit or otherwise control the rate at which the charge flows into or out of the power storage device 204 and/or from the one or more power sockets 108. For example, when the power storage device 204 is full, the charge control IC 208 may limit the flow of the charge into the power storage device 204.

The illumination circuit 200 includes a power storage device 204. The power storage device 204 may be electrically coupled to the charge control IC 208 and/or the one or more power sockets 108. The power storage device 204 may be a rechargeable battery, such as a lithium-ion battery or a nickel-cadmium battery. The power storage device 204 stores a state of charge and provides the state of charge to the light 106 to illuminate the light 106 when the light 106 is powered on. The power storage device 204 may be electrically coupled to ground on one end and coupled to the button 114 and/or the charge control IC 208 on another end e.g., in parallel, so that the charge to recharge the power storage device 204 may be regulated or controlled and/or the charge may be provided to the light 106 when powered on.

The illumination circuit 200 includes one or more buttons 114, knobs, toggles, switches or other user interfaces elements. The one or more buttons 114 may form an electrical connection, such as closing a circuit, between the power storage device 204 and/or the one or more power sockets 108 and the controller 202. When depressed, the one or more buttons 114 may close the circuit and form the electrical connection, which allows the charge to transfer or be provided to the controller 202.

Figure 3:
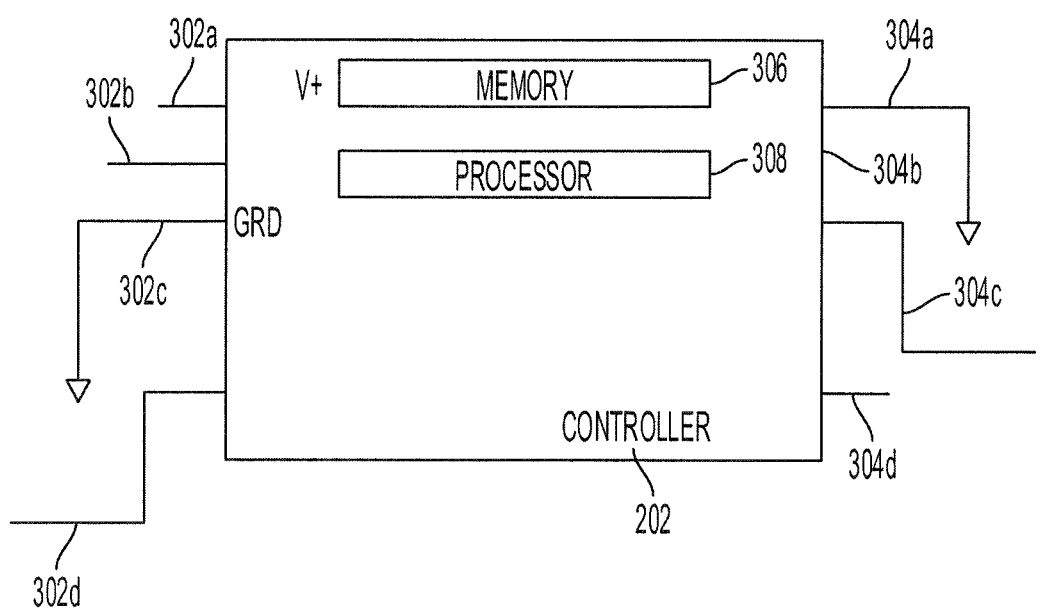
FIG. 3 is a block diagram of an example controller of the illumination control circuit of FIG. 2 according to an aspect of the invention.

The illumination circuit 200 has a controller 202. The controller 202 may be a processor, a micro-controller or other controller that executes instructions to operate the light 106. The controller 202 may change the state of the light 106 between a locked state and an unlocked state. Moreover, the controller 202 may change the mode of the light 106 between the different modes for use during the nighttime or the daytime. FIG. 3 further describes the physical components of the controller 202 and FIGS. 4-5 describes the operation of the light 106.

The controller 202 has one or more input pins, such as a voltage (V+) pin and a ground pin, and one or more output pins, which may be coupled to the LED driver 206, to provide the charge to the light 106. The controller 202 may also be coupled to the charge control IC 208 to control the amount of charge to and from the one or more power sockets 108 and/or the power storage device 204. The controller 202 provides the logic that controls different modes and/or states of the light 106 and may drive the charge through the LED driver 206 to the light 106 to illuminate the light 106.

The illumination circuit 200 may have an LED driver 206. The LED driver 206 may be electrically coupled to the controller 202 and/or the light 106. The LED driver 206 receives the charge that is outputted from the controller 202, which was received from the power storage device 204 and/or the one or more power sockets 108. The LED driver 206 is an electrical device that regulates the power to the light 106, such as a high-powered light emitting diode (LED). The LED driver 206 may be a self-contained power supply or regulator that has outputs that match those of the light 106.

The illumination circuit 200 may have an LED indicator 118 that is coupled to the controller 202. When the controller 202 detects that there is a charge, e.g., when the charging device is inserted into and providing power to the one or more power sockets 108, the controller 202 may illuminate the LED indicator 118 to indicate that the bicycle light is charging.

FIG. 3 is a block diagram of the controller 202. The controller 202 may be a micro-controller, data processing apparatus or other control device which incorporates a microprocessor. The controller 202 has one or more input pins 302a-d, one or more output pins 304a-d, the memory 306 and/or a processor 308. The one or more input pins 302a-d may receive or detect a charge from the power storage device 204 and/or the one or more power sockets 108 and/or detect the charge when the button 114 is depressed.

The controller 202 has one or more output pins 304a-d. The one or more output pins 304a-d may control the LED driver 206 to illuminate the light 106. The controller 202 has a memory 306 and a processor 308, such as a microprocessor. The memory 306 may store instructions that the processor 308 executes. The memory 306 may be coupled to the processor 308 and may include one or more of a Random Access Memory (RAM), Read-Only Memory (ROM) or other volatile or non-volatile memory. The memory 306 may be a non-transitory memory or a data storage device, such as a hard disk drive, a solid-state disk drive, a hybrid disk drive, or other appropriate data storage, and may further store machine-readable instructions, which may be loaded and executed by the processor 308.

The processor 308 may be a single processor or multiple processors and may be a micro-processor, such as part of a micro-controller. The processor 308 may include one or more processors or controllers specifically designed for detecting a charge and/or user input, such as a depression of the button 114 and/or configuring the light 106, such as changing a state or a mode of the light 106. The processor 308 may be coupled to the memory 306.

Figure 4:
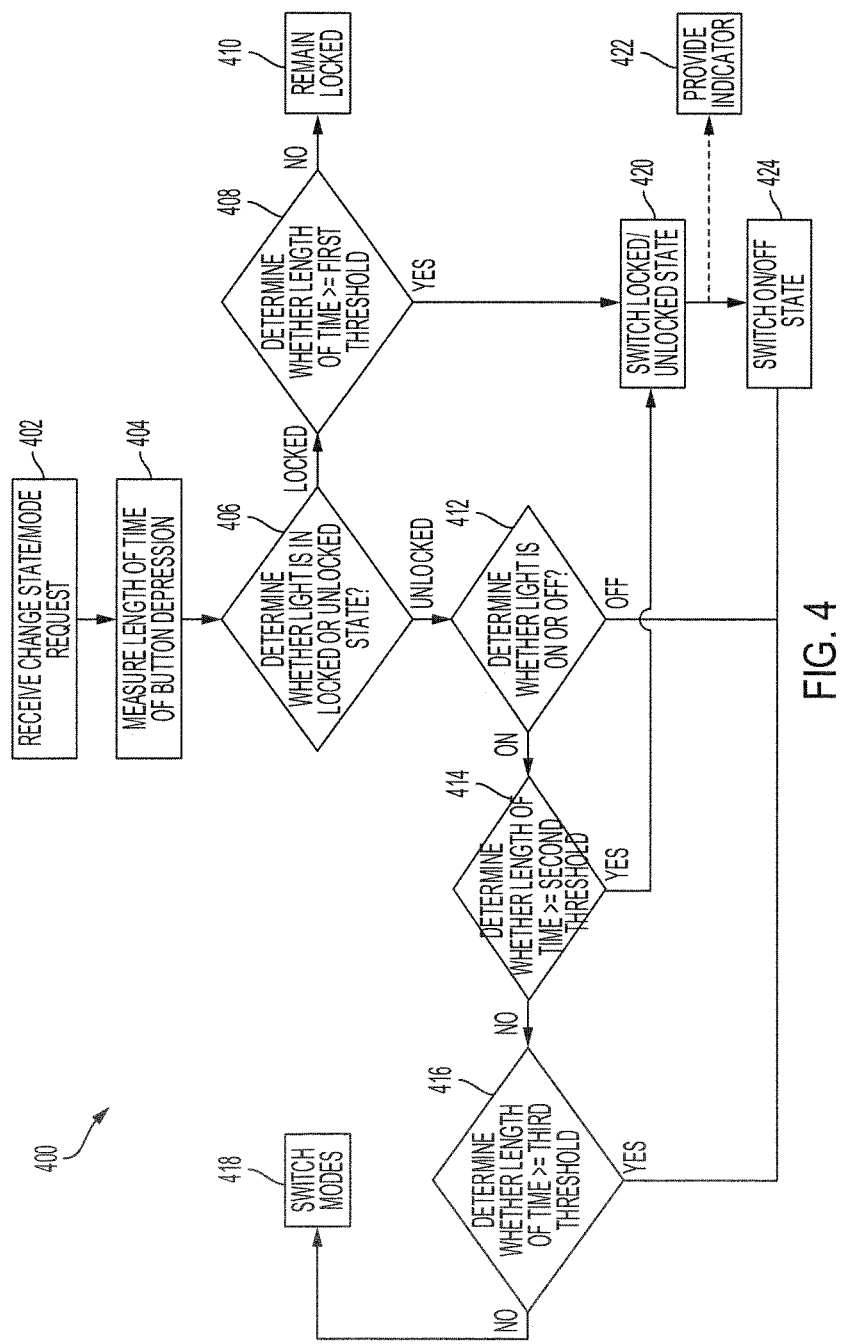
FIG. 4 is a flow diagram of an example process for operating the bicycle light of FIGS. 1A-1B in the different states and/or modes according to an aspect of the invention.

FIG. 4 is a flow diagram of a process 400 for operating the bicycle light 100 in the different states and/or modes. One or more computers or one or more data processing apparatuses, for example, the controller 202 of the bicycle light 100, appropriately programmed, may implement the process 400.

Once the current state or the current mode of the light 106 is determined, the controller 202 may receive a change state and/or mode request ("change request") of the light 106 (402). The change request indicates a request to change the state and/or mode of the light 106. The change request may be received via user input. The user input may be in the form of a depression of the button 114, or a toggling of a switch, knob or other user interface element. The change request may request that the state and/or the mode of the light 106, e.g., from a locked state to an unlocked state or from a powered on state to a powered off state.

The controller 202 may receive the change request by detecting a charge connected to one or more input pins 302a-d, such as the input pin 302b, which may be connected to the button 114. When the controller 202 receives the charge at the input pin 302b this may indicate that the button 114 has been depressed to form a closed electrical circuit with the controller 202, which allows the charge to reach the input pin 302b.

The controller 202 measures the length of time that the button 114 is depressed or otherwise toggled (404). For example, the controller 202 may measure the length of time that the charge is detected at the input pin 302b, which may indicate that the button 114 is depressed. The length of time that the button 114 is depressed, e.g., the length of time that the charge is detected, may be used to determine an action of the controller 202 that is to be performed, such as the switching of the light 106 into one or more states and/or modes.

The controller 202 determines whether the current state of the light 106 is in the locked state or the unlocked state (406). The controller 202 may check one or more flags, bits or other indicator, such as a charge on an input pin 302a-d, to determine the current state. The light 106 may be in one or more states. The one or more states may include a locked state, an unlocked state, a powered on state and/or a powered off state. In the locked state, the controller 202 prevents the illumination and other operations of the light 106 even when the button 114, such as the power button, is depressed or toggled to power on or to switch modes of the light 106. Moreover, when the light 106 is in the locked state, the controller 202 prevents the toggling or switching of the light 106 among different modes, such as the low brightness, medium brightness or other brightness levels and/or flashing of the light 106. For example, when the bicycle light 100 is placed into a person's bag, the locked state prevents the bicycle light 100 from turning on without the user's knowledge, which may drain the power storage device of the bicycle light 100. When in the locked state, the light 106 may only flash when the button 114 is depressed to indicate that the light 106 in the locked state.

The controller 202 may automatically power off or turn off the light 106 when the controller 202 is switched to the locked state. In some implementations, the controller 202 does not automatically power off or turn off the light 106 when the controller 202 is switched to the locked state.

If the light 106 is in the locked state, the controller 202 determines whether the length of time is greater than or equal to a first threshold (408). The first threshold may be pre-configured at the factory during manufacturing and/or user-configured via user input. The first threshold may be approximately 6 seconds. If the length of time is less than the first threshold, the light 106 remains in the locked state (410). Otherwise, if the length of time is greater than the first threshold, the controller 202 switches the locked/unlocked state of the light 106 (420). For example, the controller 202 switches the light from the locked state to the unlocked state.

If the light is in the unlocked state, the controller 202, the controller 202 determines whether the light 106 is also in the powered on state or the powered off state (412). The controller 202 may check the one or more flags, bits or other indicator, such as a charge on an input pin 302a-d, to determine that the light 106 is in the powered on state or the powered off state. When the light 106 is in the powered off state, the controller 202 may switch the on/off state (424). For example, the controller 202 may switch the light 106 from the powered off state to the powered on state. When the light 106 is in the powered on state, the controller 202 may further determine different actions based on the length of time.

When in the light 106 is in the unlocked state and the powered on state, the controller 202 determines whether the length of time is greater than or equal to a second threshold (414). The second threshold may be approximately 9 seconds. If the controller 202 determines that the length of time is greater than the second threshold, the controller 202 may switch the locked/unlocked state of the light 106 (420), For example, the controller 202 may switch the light 106 from the unlocked state to the locked state.

If the controller 202 determines that the length of time is less than or equal to the second threshold, the controller 202 determines whether the length of time is greater than or equal to a third threshold (416). The third threshold may be approximately 1 second. If the controller 202 determines that the length of time is greater than or equal to the third threshold and less than the second threshold, the controller 202 may switch the on/off state of the light 106 (424). For example, the controller 202 may switch the light 106 from the powered on state to the powered off state and also leave the light 106 in the unlocked state.

If the controller 202 determines that the length of time is less than third threshold, the controller 202 may switch the light 106 from a current mode to another mode (418). The controller 202 may check a flag, a bit or other indicator to determine the current mode of the light 106 and switch the current mode of the light 106 to the next mode but otherwise not change any of the states of the light 106. The modes may be in an ordered sequence and the controller 202 may scroll through the different modes while the button 114 is depressed until the length of time becomes greater than the third threshold.

The controller 202 may change the locked/unlocked state of the light 106 (420). The controller 202 may change or switch the state from a locked state to an unlocked state or from the unlocked state to the locked state. When the controller 202 changes or switches the locked/unlocked state, the controller 202 may change the flag, bit or other indicator to indicate the locked/unlocked state of the light 106 that was switched too.

The controller 202 may provide an indicator that the locked/unlocked state of the light 106 was switched (422). The controller 202 may cause the light 106 to flash, cycle or otherwise turn on/off in a sequence to indicate that the locked/unlocked state of the light 106 has changed. Moreover, the controller 202 may activate, light or other use the LED indicator 118 to indicate that the locked/unlocked state of the light 106 has changed.

After changing or switching the locked/unlocked state of the light 106, the controller 202 may switch the on/off state of the light 106 (424). The controller 202 may switch the light 106 from a powered on state to a powered off state or from a powered off state to a powered on state. When the controller 202 changes or switches the on/off state, the controller 202 may change the flag, bit or other indicator to indicate that the on/off state of the light has changed. For example, when the light 106 is switched to the locked state, the controller 202 may also turn off the state of the light 106. In another example, when the light 106 is switched to the unlocked state, the controller 202 may also turn on the state of the light 106. In some implementations, the sequence changing the locked/unlocked state, providing the indication and/or the switching of the on/off state may occur while the button 114 is depressed or may occur after button 114 has been depressed and then released.

Figure 5:
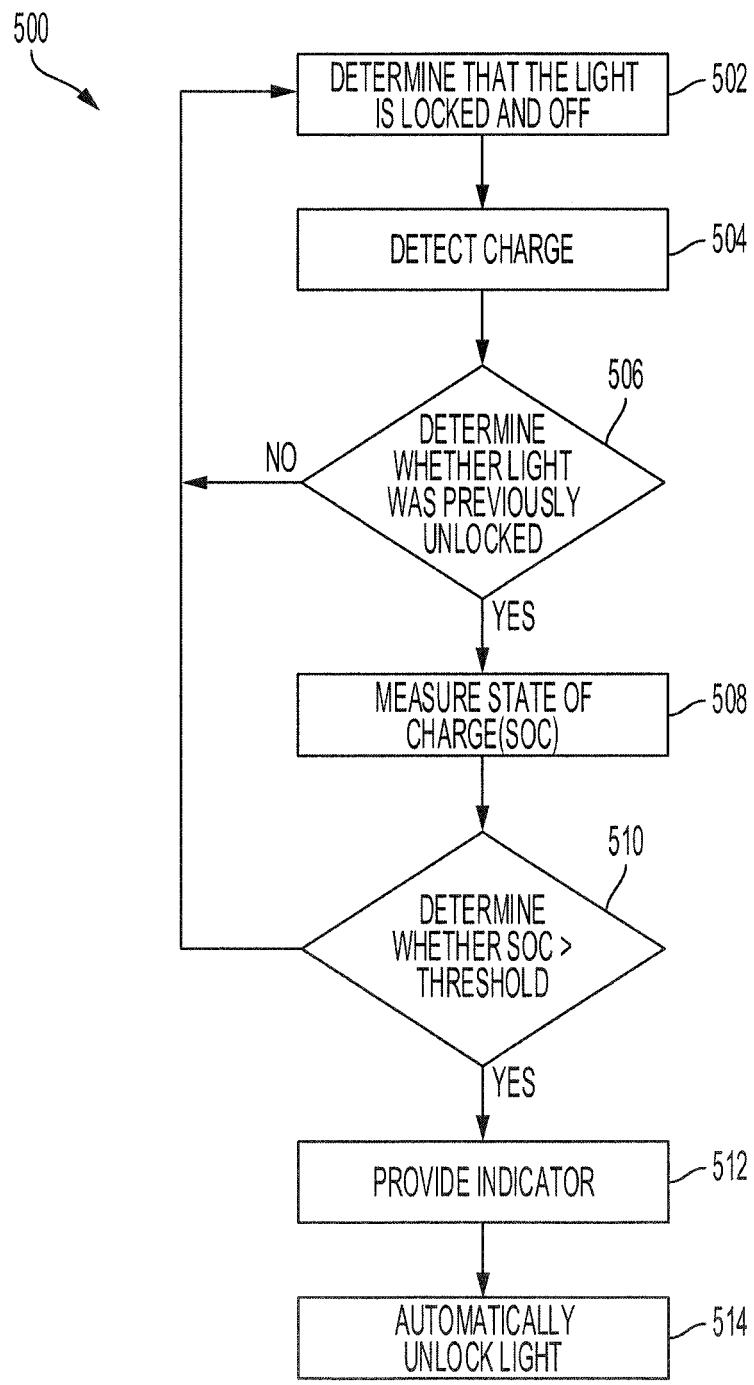
FIG. 5 is a flow diagram of an example process for automatically unlocking the bicycle light of FIGS. 1A-1B according to an aspect of the invention.

FIG. 5 is a flow diagram of a process 500 for automatically unlocking the bicycle light 100 when the bicycle light 100 is in the locked state. One or more computers or one or more data processing apparatuses, for example, the controller 202 of the bicycle light 100, appropriately programmed, may implement the process 500. The bicycle light 100 may be set in the locked state and powered off when the bicycle light 100 is shipped, sold or otherwise provided to the consumer after manufacturing to prevent the light 106 from unintentionally turning on during transport, sale and/or distribution.

The controller 202 may determine that the light 106 is in the locked state and powered off (502). The controller 202 may read a flag or other indicator or setting that indicates the state and/or mode of the light 106. When the indicator or setting indicates that the light 106 is in the locked state and powered off, the controller 202 may determine that the light 106 is in the locked state and powered off.

The controller 202 may detect a charge from the one or more power sockets 108 (504). The controller 202 may receive a charge on the input pin 302a from the one or more power socket 108. The controller 202 measures the charge and when the charge on the input pin 302a is within a range, such as approximately 4-6 volts at 400-2000 mA, the controller 202 may determine that a charging device has been inserted into or received by the one or more power sockets 108 to charge the power storage device 204. If the charge is not within the range or not detected, the controller 202 may continue to monitor for a charge within the range.

The controller 202 may determine whether the light 106 was previously unlocked (506). The controller 202 may read a flag or other indicator which indicates whether the light 106 has or has not been previously unlocked. The controller 202 may implement the automatic unlock feature when regardless of whether the light 106 has or has not been previously unlocked based on the flag or other indicator. In some implementations, however, the controller 202 may implement the automatic unlock only when the light 106 has not been previously unlocked. When the light 106 has not been previously unlocked, this may indicate a first use of the bicycle light 100. That is, the bicycle light 100 is new from the manufacture and has not been previously used. And thus, the controller 202 allows for the capability to automatic unlock of the light 106 to prevent the users from mis-identifying the bicycle light 100 as malfunctioning but not when the user intentionally has previously unlocked and then subsequently re-locked the bicycle light 100.

The controller 202 may measure a state of charge of the power storage device 204 (508). The controller 202 may use a sensor or otherwise detect the state of charge of the power storage device 204. The controller 202 may use the state of charge of the power storage device 204 as one constraint in utilizing the automatic unlock feature.

The controller 202 may determine whether the state of charge is greater than a threshold (510). For example, the controller 202 may only unlock the light 106 when the state of charge of the power storage device 204 is greater than a threshold amount, such as 10%, to allow for the power storage device 204 to charge before the light 106 is turned on. In some implementations, the controller 202 automatically unlocks the light 106 when the charge from the one or more power sockets 108 is detected regardless of the state of charge of the power storage device 204. The controller 202 may determine whether to automatically unlock the light 106 based on one of or a combination of the state of charge of the power storage device 204, the indication of whether light 106 has or has not been previously unlocked and/or the detection of the charge.

Once the controller 202 determines that the light 106 should automatically unlock, the controller 202 may provide an indicator to the user that the light 106 is being unlocked (512). The controller 202 may flash the light 106 using an on-off sequence that toggles the light 106 between the powered-on and the powered-off state. The controller 202 may have a particular sequence, such as a flashing sequence, that indicates that the light 106 is being switched between the locked and the unlocked state. In some implementations, the controller 202 may use the LED indicator 118 to indicate that the light 106 is in or being switched to the locked state or the unlocked state, such as by flashing the LED indicator 118, changing colors and/or otherwise changing a state of the LED indicator 118. If changing the state of the LED indicator 118, the controller 202 may then set the LED indicator 118 back to indicating that the power storage device 204 is being charged because the charging device is connected to the one or power sockets 108.

The controller 202 unlocks the light 106 by switching the light 106 from the locked state to the unlocked state (514). The controller 202 may also change the flag or indicator that indicates the state of the light 106. When the light 106 is unlocked, the controller 202 may leave the light 106 powered-off when the light 106 is automatically unlocked as a result of the detection of the charge from the one or more power sockets 108 because it is not necessarily the intent of the user to turn on the light 106 but rather to charge the power storage device 204.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A bicycle light, comprising:
   a power socket configured to receive a charging device;
   a light having a plurality of states including a locked state, an unlocked state, a powered on state, and a powered off state, the light being configured to illuminate when in the powered on state; and
   a controller coupled to the power socket and the light and configured to:
   determine that the light is in the locked state,
   detect electrical power from the power socket, and
   switch the light from the locked state to the unlocked state when the electrical power is detected.

2. The bicycle light of claim 1, further comprising:
   a power storage device having a state of charge and configured to provide the electrical power to the light to illuminate the bicycle light.

3. The bicycle light of claim 1, wherein the controller is configured to:
   measure the electrical power from the power socket; and
   switch the light from the locked state to the unlocked state when the electrical power is greater than or equal to a threshold charge.

4. The bicycle light of claim 1, wherein the controller is configured to:
   indicate to a user that the light is being switched from the locked state to the unlocked state after the electrical power is detected.

5. The bicycle light of claim 4, wherein to indicate to the user that the light is being switched from the locked state to the unlocked state, the controller is configured to:
   cycle the light between the powered on state and the powered off state in an on-off sequence.

6. The bicycle light of claim 1, wherein the controller is a microcontroller having a plurality of inputs including a first input that is electrically connected to the power socket, a second input that is electrically connected to a power button and a third input that is electrically grounded.

7. The bicycle light of claim 6, wherein the power socket is a Universal Serial Bus (USB) socket and the charging device is a USB device, wherein to detect the electrical power from the power socket the microcontroller is configured to receive the electrical power at the first input from an output of the USB socket.

8. A method to unlock a bicycle light, comprising:
   determining, by a controller, that the light is in a locked state;
   detecting, by the controller, electrical power from a power socket; and switching, by the controller, the light from the locked state to an unlocked state when the electrical power is detected.

9. The method of claim 8, further comprising:
determining, by the controller, that the light is in a powered on state;
receiving, by the controller, an indication that a power button was depressed; and
determining, by the controller, a length of time that the power button was depressed.

10. The method of claim 9, further comprising:
determining, by the controller, that the length of time that the power button was depressed is greater than a first threshold;
switching, by the controller, the light from the unlocked state to the locked state; and
switching, by the controller, the light in the powered on state to a powered off state.

11. The method of claim 9, further comprising:
determining, by the controller, that the length of time that the power button was depressed is less than a first threshold and less than a second threshold, wherein the first threshold is greater than the second threshold; and
switching, by the controller, the light into a different mode when in the powered on state.

12. The method of claim 11, wherein the first threshold is 9 seconds and the second threshold is 1 second.

13. The method of claim 8, further comprising:
measuring, by the controller, a state of charge of a power storage device; and
switching, by the controller, the light from the locked state to the unlocked state when the state of charge is greater than or equal to a threshold charge.

14. The method of claim 13, further comprising:
indicating to a user that the light is being switched from the locked state to the unlocked state after the electrical power is detected.

15. A bicycle light, comprising:
a power socket configured to receive a charging device;
a light having a plurality of states including a locked state, an unlocked state, a powered on state, and a powered off state, the light being configured to illuminate when in the powered on state;
a power storage device having a state of charge and configured to power the light; and
a microcontroller coupled to the power socket, the power storage device and the light and configured to:
detect electrical power from the power socket, and
switch the light from the locked state to the unlocked state when the electrical power is detected.

16. The bicycle light of claim 15, wherein the microcontroller is configured to:
measure the state of charge of the power storage device; and
switch the light from the locked state to the unlocked state when the state of charge is greater than or equal to a threshold charge and the electrical power is detected.

17. The bicycle light of claim 15, wherein the microcontroller is configured to:
indicate to a user that the light is being switched from the locked state to the unlocked state after the electrical power is detected.

18. The bicycle light of claim 17, wherein to indicate to the user that the light is being switched from the locked state to the unlocked state, the controller is configured to:
cycle the light between the powered on state and the powered off state in an on-off sequence to indicate to the user that the light is being switched from the locked state to the unlocked state.

19. The bicycle light of claim 15, wherein the microcontroller is configured to:
switch the light from the locked state to the unlocked state when the electrical power is detected and when a flag indicates that the light has not been previously switched to the unlocked state.

20. The bicycle light of claim 19, wherein the microcontroller is configured to:
set the flag to indicate that the light has been previously switched to the unlocked state.

* * * * *